US012573737B2

(12) United States Patent
Favreau et al.

(10) Patent No.: US 12,573,737 B2
(45) Date of Patent: Mar. 10, 2026

(54) ADDITIVELY-MANUFACTURED ELECTRICAL TRANSMISSION LINE, AND METHOD OF MAKING

(71) Applicant: Raytheon Company, Arlington, VA (US)

(72) Inventors: Channing P. Favreau, Barre, MA (US); Lawrence A. Binek, Glastonbury, CT (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/640,815

(22) Filed: Apr. 19, 2024

(65) Prior Publication Data

US 2024/0387972 A1 Nov. 21, 2024

Related U.S. Application Data

(60) Provisional application No. 63/502,734, filed on May 17, 2023.

(51) Int. Cl.
*H01P 3/08* (2006.01)
*H01P 11/00* (2006.01)

(52) U.S. Cl.
CPC .............. *H01P 3/08* (2013.01); *H01P 11/003* (2013.01)

(58) Field of Classification Search
CPC ................................ H01P 3/08; H01P 11/003
See application file for complete search history.

(56) References Cited

U.S. PATENT DOCUMENTS 3,686,624 A 8/1972 Napoli et al.
9,312,589 B2 * 4/2016 Sherrer .................. H01P 5/183
(Continued)

FOREIGN PATENT DOCUMENTS

CN 111446043 7/2020
CN 216388824 4/2022
TW 202447649 12/2024
(Continued)

OTHER PUBLICATIONS

"International Application Serial No. PCT US2024 029675, International Search Report mailed Sep. 6, 2024", 5 pgs.
(Continued)

*Primary Examiner* — Samuel S Outten
(74) *Attorney, Agent, or Firm* — Schwegman Lundberg & Woessner, P.A.

(57) ABSTRACT

An additively-manufactured electrical transmission line is made as a single, unitary continuous monolithic additively-manufactured piece of material, including an outer housing defining a cavity therewithin, a conductive stripline passing through the cavity, and stubs within the cavity electrically coupling the outer housing to the stripline. The stripline may be a flat stripline. The stubs may be angled relative to the stripline, to facilitate surface treatment within the housing, such as abrasive flow machining to reduce surface roughness, which may be part of a method of making the electrical transmission line. The electrical transmission line may be part of an electrical installation including multiple such electrical transmission lines, which may have shapes, including curved shapes, for making desired electrical connections between components.

18 Claims, 3 Drawing Sheets

(56) References Cited

U.S. PATENT DOCUMENTS

| | | | |
|---|---|---|---|
| 2015/0097746 | A1 | 4/2015 | Wilson et al. |
| 2017/0263994 | A1 | 9/2017 | Brown et al. |

FOREIGN PATENT DOCUMENTS

| | | |
|---|---|---|
| WO | 2023113940 | 6/2023 |
| WO | 2024238780 | 11/2024 |

OTHER PUBLICATIONS

"International Application Serial No. PCT US2024 029675, Written Opinion mailed Sep. 6, 2024", 9 pgs.
"Taiwanese Application Serial No. 113115512, Office Action mailed Dec. 9, 2024", With English Machine Translation, 25 pgs.
"Taiwanese Application Serial No. 113115512, Response filed Feb. 11, 2025 to Office Action mailed Dec. 9, 2024", w current English claims, 17 pgs.

* cited by examiner

ADDITIVELY-MANUFACTURED ELECTRICAL TRANSMISSION LINE, AND METHOD OF MAKING

CLAIM OF PRIORITY

This patent application claims the benefit of U.S. Provisional Patent Application No. 63/502,734, filed May 17, 2023, which is incorporated by reference herein in its entirety.

FIELD

The disclosure is in the field of electrical transmission lines.

BACKGROUND

Additively-manufactured overhanging surfaces can cause degraded performance when using tuners to support a central conductor of an electrical transmission line. Examples of such degraded performance are electrical losses, higher-order mode propagation, and signal reflections.

SUMMARY

An additively-manufactured electrical transmission line is configured to allow surface treatment of even interior surfaces, after formation.

According to an aspect of the disclosure, an electrical transmission line includes: an outer housing defining a cavity therewithin; a conductive stripline passing through the cavity; and stubs within the cavity electrically coupling the outer housing to the stripline; wherein the outer housing, the stripline, and the stubs are all parts of a single unitary continuous monolithic additively-manufactured transmission line.

According to an embodiment of any paragraph(s) of this summary, the stubs are angled at an acute angle relative to a direction of extent of the conductive stripline.

According to an embodiment of any paragraph(s) of this summary, the stripline is flat.

According to an embodiment of any paragraph(s) of this summary, the stripline has a rectangular cross section.

According to an embodiment of any paragraph(s) of this summary, transmission line ends of the stripline have a circular cross section, with transition regions between the rectangular cross section and the transmission line ends.

According to an embodiment of any paragraph(s) of this summary, the stripline has transmission line ends at opposite ends of the stripline.

According to an embodiment of any paragraph(s) of this summary, the outer housing narrows around the transmission line ends, defining narrowed passages that are in fluid connection with the cavity.

According to an embodiment of any paragraph(s) of this summary, the stubs have an angle of between 30 and 60 degrees to the stripline.

According to an embodiment of any paragraph(s) of this summary, the stubs have an angle of between 40 and 50 degrees to the stripline.

According to an embodiment of any paragraph(s) of this summary, the stubs extend off opposite sides of the stripline.

According to an embodiment of any paragraph(s) of this summary, the stubs are staggered, alternating between the opposite sides in a longitudinal direction along the stripline.

According to an embodiment of any paragraph(s) of this summary, the stubs have convex opposite streamlined surfaces that facilitate flow past the stubs.

According to an embodiment of any paragraph(s) of this summary, air in the cavity functions as a dielectric around the stripline.

According to an embodiment of any paragraph(s) of this summary, the electrical transmission line is non-straight.

According to an embodiment of any paragraph(s) of this summary, the electrical transmission line is (or is part of) a connector.

According to an embodiment of any paragraph(s) of this summary, the electrical transmission line is (or is part of) a cable.

According to another aspect of the disclosure, an electrical installation between a pair of devices includes: electrical conductors coupling conductors of one of the devices with conductors of the other of the devices, the electrical conductors each including: an outer housing defining a cavity therewithin; a conductive stripline passing through the cavity; and stubs within the cavity electrically coupling the outer housing to the stripline; wherein the outer housing, the stripline, and the stubs are all parts of a single unitary continuous monolithic additively-manufactured transmission line; wherein at least some of the electrical conductors are non-straight electrical conductors.

According to yet another aspect of the disclosure, a method of making an electrical transmission line, the method comprising: additively forming, as a single piece, the electrical conductor including: an outer housing defining a cavity therewithin; a conductive stripline passing through the cavity; and stubs electrically coupling the outer housing to the stripline; and treating internal surfaces of the outer housing, the conductive stripline, and the subs, to reduce surface roughness.

According to an embodiment of any paragraph(s) of this summary, the additively forming includes powdered bed forming.

According to an embodiment of any paragraph(s) of this summary, the additively forming includes laser powdered bed forming.

According to an embodiment of any paragraph(s) of this summary, the additively forming includes forming the electrical conductor in a longitudinal direction.

According to an embodiment of any paragraph(s) of this summary, the treating includes abrasive flow machining of the internal surfaces.

According to an embodiment of any paragraph(s) of this summary, the abrasive flow machining includes passing a fluid with abrasive material back and forth through the cavity.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

DETAILED DESCRIPTION

An additively-manufactured electrical transmission line is made as a single, unitary continuous monolithic additively-manufactured piece of material, including an outer housing defining a cavity therewithin, a conductive stripline passing through the cavity, and stubs within the cavity electrically coupling the outer housing to the stripline. The stripline may be a flat stripline. The stubs may be angled relative to the stripline, to facilitate surface treatment within the housing, such as abrasive flow machining to reduce surface roughness, which may be part of a method of making the electrical transmission line. The electrical transmission line may be part of an electrical installation including multiple such electrical transmission lines, which may have shapes, including curved shapes, for making desired electrical connections between components.

Figure 1:
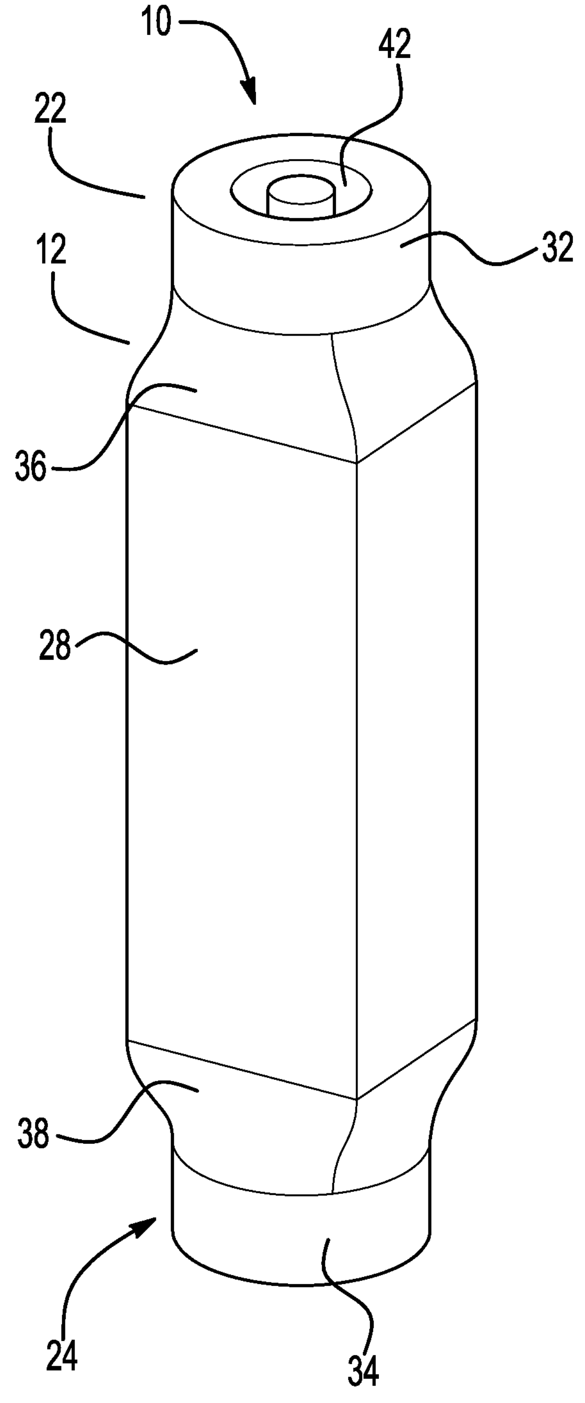
FIG. 1 is an oblique view of an electrical transmission line according to an embodiment.
Figure 2:
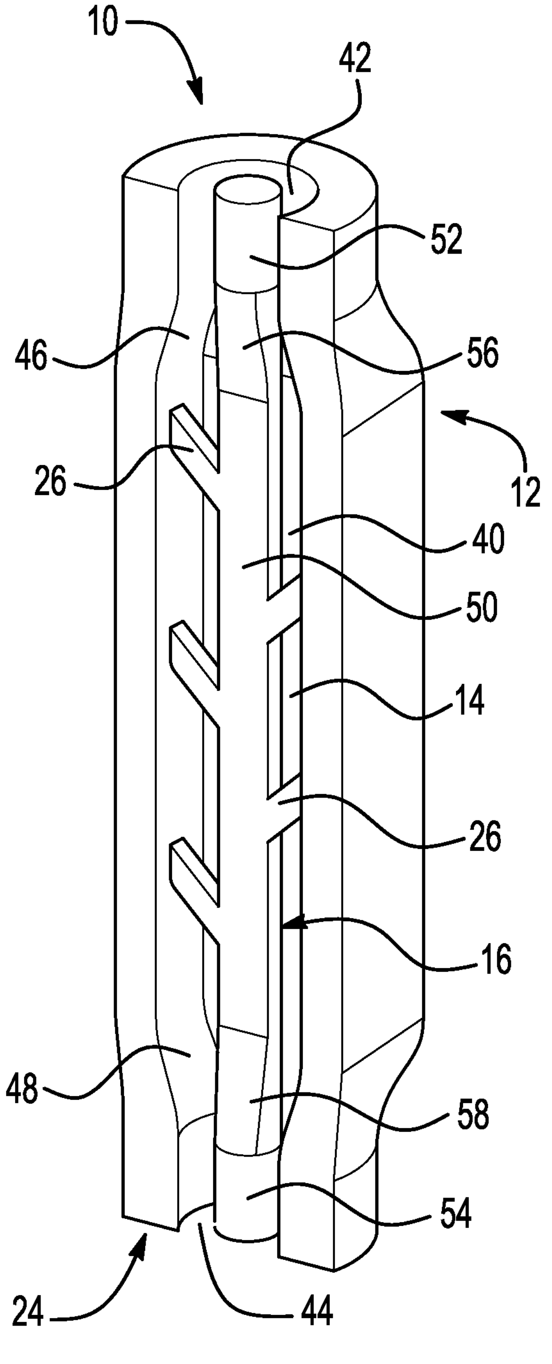
FIG. 2 is a sectional oblique view of the electrical transmission line of FIG. 1.
Figure 3:
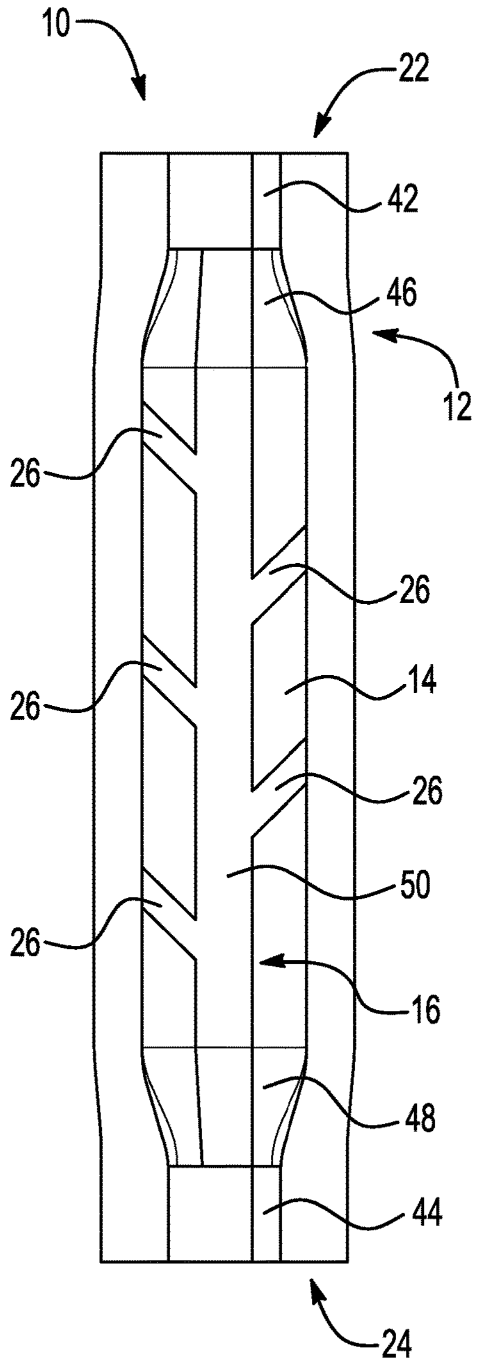
FIG. 3 is a side sectional view of the electrical transmission line of FIG. 1.

FIGS. 1-3 show an electrical transmission line (or interconnection) 10 for electrically connecting together devices (not shown). The illustrated embodiment is a transmission line compatible with a corresponding connector, but many other electrical transmission line configurations are possible. The electrical transmission line 10 may be a cable, or part of a cable, such as with connectors at its ends. Alternatively the electrical transmission line 10 may be a connector, or part of a connector.

The electrical transmission line 10 is a single-piece additively manufactured piece. The electrical transmission line 10 includes a housing 12 that surrounds and defines a central cavity 14 in it. A stripline 16 runs through the cavity 14, from a first end 22 of the transmission line 10 to an opposite (second) end 24 of the transmission line 10. The stripline 16 is electrically (and physically) connected to the housing 12 by a series of stubs 26 running between the stripline 16 and the housing 12, within the cavity 14.

Details are now given regarding the illustrated embodiment of the electrical transmission line 10 shown in FIGS. 1-3. It should be understood that many alternative configurations are possible for the parts described in greater detail below.

The housing 12 may have a wider central portion 28, with narrower end portions 32 and 34. The central portion 28 may be rectangular, and the end portions 32 and 34 may have circular cross sections. There may be transitions 36 and 38 between the different shapes of the central portion 28, and the respective end portions 32 and 34.

The cavity 14 has a wider central region 40 and narrower end regions 42 and 44, with tapering transition regions 46 and 48 between the central region 40 and the respective end regions 42 and 44. The central region 40 may have a rectangular shape, bounded by flat inner walls of the housing central portion 28, and the end regions 42 and 44 may be bounded by rounded inner walls of the housing end portions 32 and 34. The transition regions 46 and 48 of the cavity 14 are defined by curved housing inner surfaces, between the flat walls of the central region 40 and the end regions 42 and 44. This facilitates flow of fluid material through the cavity 14, such as for post-formation surface treatment to reduce roughness of the inner surface of the housing 12 that defines the cavity 14. The end regions 42 and 44 may be narrowed annular passages that are in fluid communication with the central region 40.

The stripline 16 includes a flat central section 50 and round ends 52 and 54. Transition regions 56 and 58 gradually vary the shape of the stripline from the flat central section 50, with its rectangular cross section, and stripline ends 52 and 54.

The stubs 26 have a herringbone pattern, extending from alternate sides of the stripline central section 50 (when considered from the standpoint of a longitudinal direction along the stripline 16) to the inner walls of the housing central portion 28. The stubs 26 provide a physical and electrical connection between the stripline 16 and the housing 12. The stubs 26 are angled relative to the stripline central section 50. This angling may facilitate flow of abrasive material through the cavity 14, for example to reduce surface roughness after formation of the electrical transmission line 10.

The stubs 26 may be about a 45 degree angle to an longitudinal extent of the stripline central section 50. More broadly the stubs 26 may be at angle of from 40 to 50 degrees, or from 30 to 60 degrees, to the longitudinal extent of the stripline 16.

The stubs 26 may have a rectangular cross-section shape. Alternatively, as described further below, the stubs 26 may have a cross section shape that facilitates flow of abrasive fluid material past them, such as a tapered shape that is thicker in the middle and thinner on the edges.

The stubs 26 provide a short-circuit coupling between the stripline 16 and the housing 12. The stubs 26 may be configured in conjunction with the air-filled (dielectric) spaces around the stripline 16 to achieve desired electrical performance in the electrical transmission line 10. For example the configuration may achieve desired isolation from radio frequency (RF) interference. Alternatively or in addition, spaces around the stripline 16 may be filled with other dielectric materials, such as (for example) suitable powders, liquids, or resins.

The electrical transmission line 10 may be made out of any of a variety of suitable materials. Examples of suitable electrically-conductive materials include metals, such as aluminum or titanium; metal alloys, such as aluminum-based alloys, for example A205, and such as nickel-based alloys marketed under the trademark INCONEL; and metal-coated polymers.

The electrical transmission line 10 may be produced in an additive manufacturing process, for example being formed by a powder bed fusion method. In such a method selective heating, such as from a laser or electron beam, is used to fuse (sinter) portions of a bed of powdered raw material, with the electrical transmission line 10 built up layer by layer. The electrical transmission line 10 may be built up in a vertical direction, such as along a longitudinal direction along the stripline 16.

After the process to additively manufacture the electrical transmission line 10, the transmission line 10 may be subject to treatment to improve its finish. This may include abrasive flow machining, a process in which an abrasive fluid (a fluid containing abrasive particles) is passed through the cavity 14 in either or both directions (from the end 22 to the end 24, and/or from the end 24 to the end 22), perhaps multiple times, in order to obtain a smoother finish even on interior surfaces of the electrical transmission line 10.

The electrical transmission line 10 offers many advantages. The parallel center conductor (the stripline 16) and the ground walls of the housing 12 enables easy vertical printing (additive manufacturing). Rectangular cross section transmission lines avoid downward facing surfaces and thin wall features. The angled configuration of the stubs 26 enables easy printing and minimizes complications that might arise from partial sintering.

In the configuration of the electrical transmission line 10 the herringbone configuration of the stubs 26 conforms with additive manufacturing guidelines. In addition the possibility of partially sintered powder on downward-facing surfaces is minimized. The avoidance of partially sintering of powder reduces the possibility of foreign object damage (FOD) from such partially-sintered powder. Surface finish may be improved, even though no complex machining post-processing steps are needed.

Many variations in configuration are possible. For example the number and configuration of the stubs 26 may be varied to achieve desired wideband performance in the electrical transmission line 10. The stubs 26 also may advantageously provide a robust structural and thermal arrangement for the components of the electrical transmission line 10. High-temperature transmission lines may thus be formed.

Figure 4:
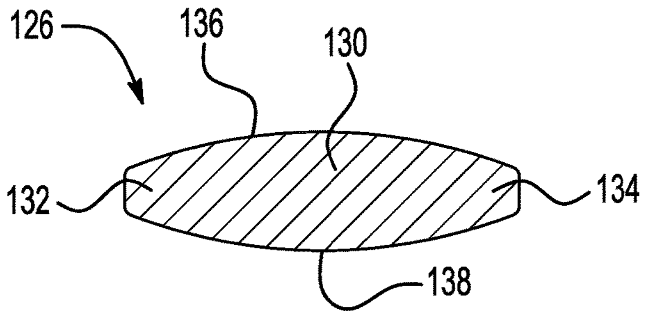
FIG. 4 is a cross section of a stub usable with the electrical transmission line of FIG. 1.

FIG. 4 shows a possible cross-section shape for a stub 126, which may be used in place of the stubs 26 (FIG. 2). The stub 126 has a nonuniform thickness, being thicker in its middle 130 than at its edges 132 and 134, and having convex curved upper and lower surfaces 136 and 138. The cross-sectional shape of the stub 126 may be facilitate movement of fluid, such as abrasive machining fluid, past the stub 126 during an abrasive flow machining process. The stub 126 may advantageously have low drag and/or facilitate exposure to the abrasive fluid.

Figure 5:
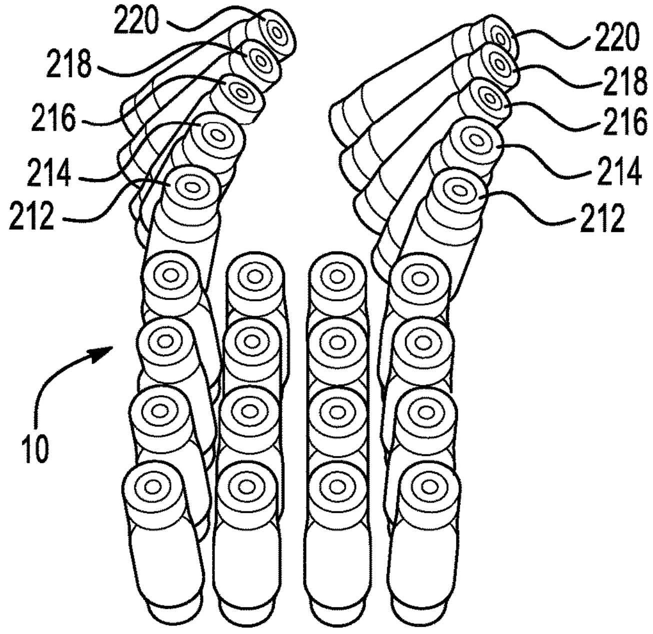
FIG. 5 is an oblique view of various configurations of electrical transmission lines, including non-straight (or curved, or tilted) electrical transmission lines.

FIG. 5 shows examples of straight electrical transmission lines 10, such as described above, and examples of tilted electrical transmission lines 212, 214, 216, 218, and 220, having varying degrees of curvature. The titled transmission lines 212-220 have internal structure similar to that of the electrical transmission lines 10 (FIG. 2), but can be configured in any of a variety of suitable shapes, for example to connect conductors of devices that are not aligned.

Figure 6:
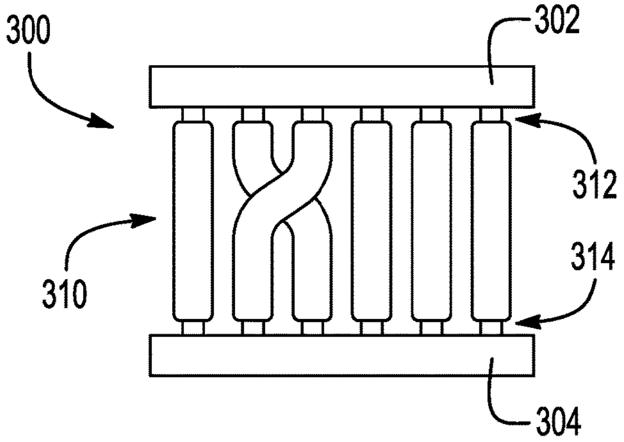
FIG. 6 shows an electrical installation using electrical couplers to electrically connect conductors of two devices.

FIG. 6 shows an electrical installation 300 electrically connecting a pair of devices 302 and 304, using a series of electrical transmission lines 310. The electrical transmission lines 310 may have configurations similar to those of the electrical transmission lines 10 (FIGS. 1-3) and 212-220 (FIG. 5) described above. The overall shapes of the electrical transmission lines 310 may be configured to make connections between aligned or offset conductors 312 and 314 of the devices 302 and 304. The transmission lines 310 may be straight or may be curved as necessary to link up the devices 302 and 304. The use of the electrical transmission lines 310 may be an alternative to the use of flexible wires or cables, and may make for more efficient packing in of connections, with improved performance, such as better avoiding electrical interference in the connections. Advantages may include improved signal integrity, lower loss, simplified assembly, and/or reduced cost.

Figure 7:
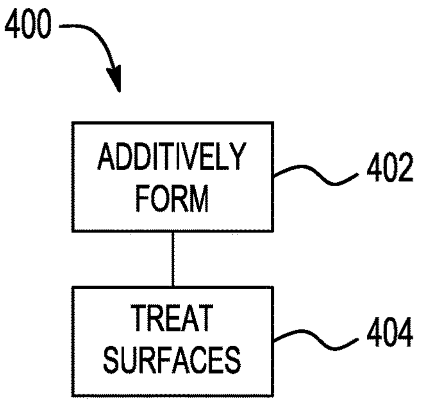
FIG. 7 is a high-level flow chart of a method of making an electrical transmission line.

FIG. 7 shows a high-level flow chart of a method 400 for making an electrical transmission line, such as the electrical transmission lines 10 (FIGS. 1-3) and 212-220 (FIG. 5) described above. In step 402 the electrical transmission line is additively formed as a single piece, the piece including the housing, the conductive stripline, and the stubs. The additive forming may include powder bed forming, such as laser powdered bed forming. In step 404 surfaces of the electrical transmission line are treated to reduce surface roughness. The surface treatment may include abrasive flow machining of internal surfaces of the electrical transmission line.

Figure 8:
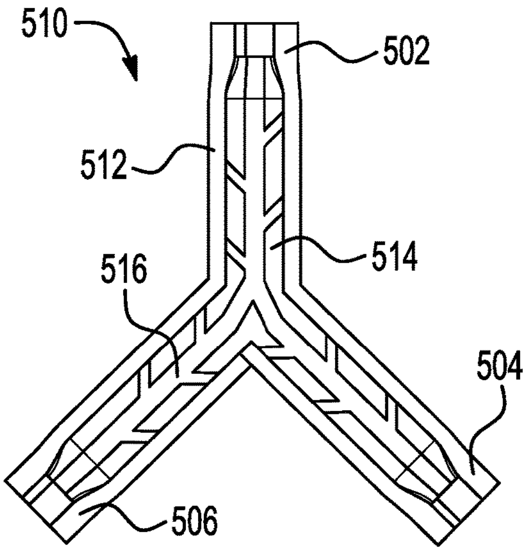
FIG. 8 is a sectional view of an electrical transmission line according to another embodiment, a splitter/combiner.
Figure 9:
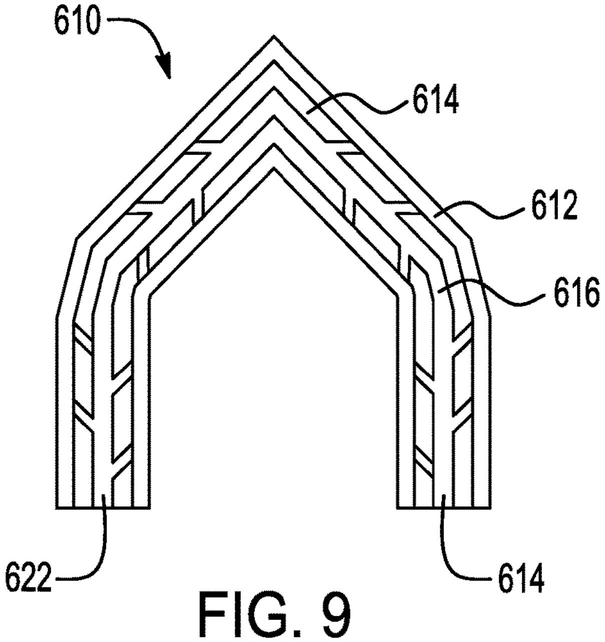
FIG. 9 is a sectional view of an electrical transmission line according to yet another embodiment, a jumper with rectangular ends.
Figure 10:
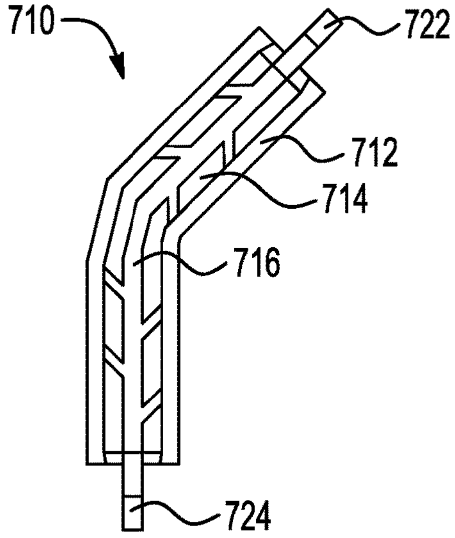
FIG. 10 is a sectional view of an electrical transmission line according to still another embodiment, an angled transmission line with extended ends.

FIGS. 8-10 show examples of other possible transmission line configurations, with various types of ends. Details regarding the embodiments shown in FIGS. 8-10 may be similar to those described above. In addition, details from various embodiments may be combinable with one another. For example the ends of the various embodiments described herein may be combinable with any of the embodiment shapes. Also, the dielectric materials of the various embodiments (air, solid, powder, or liquid) may be employed in other of the embodiments.

FIG. 8 shows a splitter/combiner transmission line 510 having three legs 502, 504, and 506. A cavity 514 between a stripline 516 and a housing 512 may be filled (in whole or in part) with an epoxy.

FIG. 9 shows a jumper transmission line 610 having a U-shape. A cavity 614 between a stripline 616 and a housing 612 may be filled (in whole or in part) with a dielectric powder, for example a polytetrafluoroethylene (PTFE) powder. Ends 622 and 624 of the stripline 616 may have rectangular cross-sectional shapes.

FIG. 10 shows an angled transmission line 710, having a 45-degree bend. Many other angles are possible as alternatives. A cavity 714 between a stripline 716 and a housing 712 may be filled (in whole or in part) with a dielectric liquid, for example an ionic liquid. Ends 722 and 724 of the stripline 716 extend beyond the housing 712.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. An electrical transmission line comprising:

an outer housing defining a cavity therewithin;

a conductive stripline passing through the cavity; and stubs within the cavity electrically coupling the outer housing to the stripline;

wherein the outer housing, the stripline, and the stubs are all parts of a single unitary continuous monolithic additively-manufactured transmission line;

wherein the stubs extend off opposite sides of the stripline; and wherein the stubs are staggered, alternating between the opposite sides in a longitudinal direction along the stripline.

2. The electrical transmission line of claim 1, wherein the stripline has a rectangular cross section.

3. The electrical transmission line of claim 2, wherein transmission line ends of the stripline have a circular cross section, with transition regions between the rectangular cross section and the transmission line ends.

4. The electrical transmission line of claim 1, wherein the stubs are angled at an acute angle relative to a direction of extent of the conductive stripline.

5. The electrical transmission line of claim 1, wherein the stripline is flat.

6. The electrical transmission line of claim 1, wherein the stripline has transmission line ends at opposite ends of the stripline; and wherein the outer housing narrows around the transmission line ends, defining narrowed passages that are in fluid connection with the cavity.

7. The electrical transmission line of claim 1, wherein the stubs have an angle of between 30 and 60 degrees to the stripline.

8. The electrical transmission line of claim 1, wherein the stubs have an angle of between 40 and 50 degrees to the stripline.

9. The electrical transmission line of claim 1, wherein the stubs have convex opposite streamlined surfaces that facilitate flow past the stubs.

10. The electrical transmission line of claim 1, wherein air in the cavity functions as a dielectric around the stripline.

11. The electrical transmission line of claim 1, wherein the electrical transmission line is non-straight.

12. An electrical installation between a pair of devices, the installation comprising:

electrical conductors coupling conductors of one of the devices with conductors of the other of the devices, the electrical conductors each including:

an outer housing defining a cavity therewithin;

a conductive stripline passing through the cavity; and stubs with in the cavity electrically coupling the outer housing to the stripline;

wherein the outer housing, the stripline, and the stubs are all parts of a single unitary continuous monolithic additively-manufactured transmission line;

wherein at least some of the electrical conductors are non-straight electrical conductors;

wherein the stubs extend off opposite sides of the stripline; and wherein the stubs are staggered, alternating between the opposite sides in a longitudinal direction along the stripline.

13. A method of making an electrical transmission line, the method comprising:

additively forming, as a single piece, the electrical conductor including:

an outer housing defining a cavity therewithin;

a conductive stripline passing through the cavity; and stubs electrically coupling the outer housing to the stripline, wherein the stubs extend off opposite sides of the stripline, and wherein the stubs are staggered, alternating between the opposite sides in a longitudinal direction along the stripline; and treating internal surfaces of the outer housing, the conductive stripline, and the subs, to reduce surface roughness.

14. The method of claim 13, wherein the treating includes abrasive flow machining of the internal surfaces.

15. The method of claim 14, wherein the abrasive flow machining includes passing a fluid with abrasive material back and forth through the cavity.

16. The method of claim 13, wherein the additively forming includes powdered bed forming.

17. The method of claim 13, wherein the additively forming includes laser powdered bed forming.

18. The method of claim 13, wherein the additively forming includes forming the electrical conductor in a longitudinal direction.

* * * * *